(12) United States Patent
Jitsui

(10) Patent No.: US 12,481,182 B1
(45) Date of Patent: Nov. 25, 2025

(54) ELECTRONIC DEVICE

(71) Applicant: Innolux Corporation, Miaoli County (TW)

(72) Inventor: Kazuto Jitsui, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/792,556

(22) Filed: Aug. 2, 2024

(51) Int. Cl.
| | | |
|---|---|---|
| G02F 1/13 | (2006.01) | |
| G02F 1/1335 | (2006.01) | |
| G02F 1/1337 | (2006.01) | |
| G02F 1/1347 | (2006.01) | |
| G02F 1/139 | (2006.01) | |

(52) U.S. Cl.
CPC ...... *G02F 1/1323* (2013.01); *G02F 1/133526* (2013.01); *G02F 1/133742* (2021.01); *G02F 1/133784* (2013.01); *G02F 1/1347* (2013.01); *G02F 1/1396* (2013.01)

(58) Field of Classification Search
CPC ............. G02F 1/1323; G02F 1/133526; G02F 1/133742; G02F 1/133784; G02F 1/1347; G02F 1/1396
See application file for complete search history.

(56) References Cited

U.S. PATENT DOCUMENTS

| | | | | |
|---|---|---|---|---|
| 8,408,775 | B1 * | 4/2013 | Coleman | ........... G02F 1/133526 |
| | | | | 362/616 |
| 2017/0237972 | A1 * | 8/2017 | Im | .......... H04N 13/317 |
| | | | | 348/59 |
| 2020/0371386 | A1 | 11/2020 | Liou et al. | |
| 2024/0257775 | A1 * | 8/2024 | Masuda | ............ G02F 1/134372 |
| 2025/0028196 | A1 * | 1/2025 | Gwon | ................... G02F 1/1323 |

FOREIGN PATENT DOCUMENTS

TW   202323948   6/2023

* cited by examiner

*Primary Examiner* — Donald L Raleigh
(74) *Attorney, Agent, or Firm* — JCIPRNET

(57) ABSTRACT

An electronic device configured to switch between a share mode and a privacy mode includes a light emitting unit, a first viewing angle control unit, a lens array and a display unit. The first viewing angle control unit is disposed on the light emitting unit and includes a first region and a second region adjacent to the first region. The lens array is disposed on the first viewing angle control unit. The display unit is disposed on the lens array. In the privacy mode, a first voltage is provided to the first region of the first viewing angle control unit, a second voltage is provided to the second region of the first viewing angle control unit, and the first voltage is different from the second voltage.

19 Claims, 11 Drawing Sheets

ELECTRONIC DEVICE

BACKGROUND

Technical Field

The disclosure relates to an electronic device.

Description of Related Art

Electronic devices have become indispensable items in modern society. In some usage scenarios, electronic devices have privacy protection requirements. However, there are still some problems (e.g., light leakage at large viewing angles) that need to be solved in current electronic devices with privacy protection functions.

SUMMARY

The disclosure provides an electronic device, which facilitates the reduction in light leakage at large viewing angles in the privacy mode.

In an embodiment of the disclosure, an electronic device configured to switch between a share mode and a privacy mode includes a light emitting unit, a first viewing angle control unit, a lens array and a display unit. The first viewing angle control unit is disposed on the light emitting unit and includes a first region and a second region adjacent to the first region. The lens array is disposed on the first viewing angle control unit. The display unit is disposed on the lens array. In the privacy mode, a first voltage is provided to the first region of the first viewing angle control unit, a second voltage is provided to the second region of the first viewing angle control unit, and the first voltage is different from the second voltage.

In order to make the aforementioned features and advantages of the disclosure comprehensible, embodiments accompanied with drawings are described in detail as follows.

DESCRIPTION OF THE EMBODIMENTS

Figure 1A:
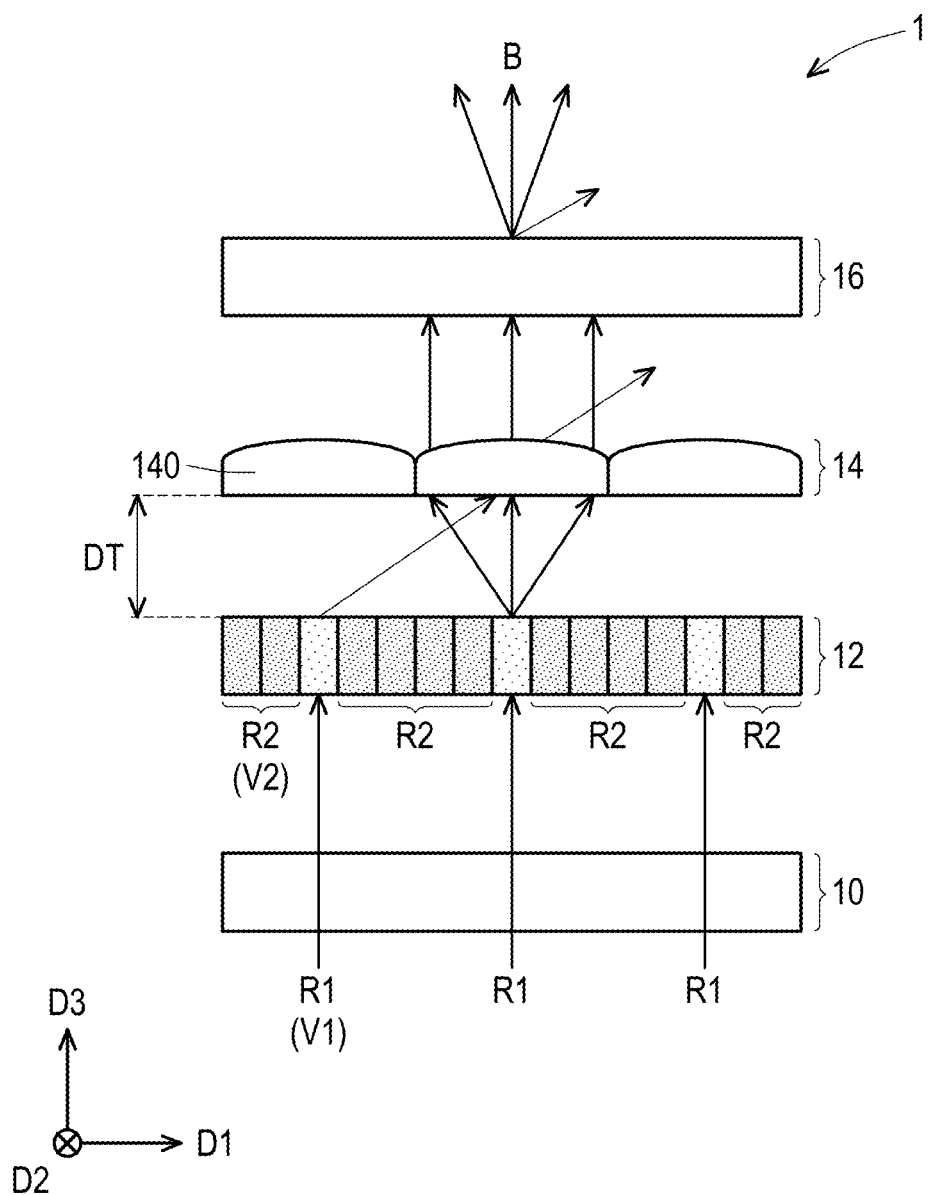
FIG. 1A and FIG. 1B are respectively partial cross-sectional schematic diagrams of an electronic device in a privacy mode and a share mode according to some embodiments of the disclosure.

Reference is now made in detail to exemplary embodiments of the disclosure, and examples of the exemplary embodiments are illustrated in the accompanying drawings. If applicable, the same reference numerals in the drawings and the descriptions are used to indicate the same or similar parts.

Certain terms are used to refer to specific elements throughout the specification of the disclosure and the appended claims. Those of ordinary skill in the art should understand that electronic device manufacturers may refer to the same elements by different names. The following embodiments do not intend to distinguish between elements with the same function but different names. In the description and claims below, words such as "including" and "comprising" are open-ended words, so these words should be interpreted as the meaning of "including but not limited to . . . ."

In the following embodiments, wordings used to indicate directions, such as "up," "down," "front," "back," "left," and "right," merely refer to directions in the accompanying drawings. Therefore, the directional wordings are used to illustrate rather than limit the disclosure. In the accompanying drawings, the drawings illustrate the general features of the methods, structures, and/or materials used in the particular embodiments. However, the drawings shall not be interpreted as defining or limiting the scope or nature covered by the embodiments. For example, the relative size, thickness, and location of film layers, regions, and/or structures may be reduced or enlarged for clarity.

In the disclosure, a structure (or layer, element, substrate) is described as being on or above another structure (or layer, element, substrate), which may mean that the two structures are adjacent and directly connected, or may mean that the two structures are adjacent but not directly connected. Non-direct connection refers to the presence of at least one intermediate structure (or intermediate layer, intermediate element, intermediate substrate, intermediate spacer) between the two structures, with the lower surface of one structure adjacent or directly connected to the upper surface of the intermediate structure, and the upper surface of the other structure adjacent or directly connected to the lower surface of the intermediate structure. The intermediate structure may be composed of single or multiple layers of physical or non-physical structures, with no limitations. In the disclosure, when a structure is placed "on" another structure, such description may mean that the structure is "directly" on the another structure, or may mean that the structure is "indirectly" on the another structure, that is, at least one structure is sandwiched and disposed between the structure and the another structure.

The terms "approximately," "equal to," "equivalent" or "the same," "substantially" or "roughly" are generally interpreted as within 20% of the given value or range, or interpreted as within 10%, 5%, 3%, 2%, 1%, or 0.5% of the given value or range. In addition, the wordings "a range from a first value to a second value" and "a range between a first value and a second value" indicate that the described range includes the first value, the second value, and other values therebetween.

The ordinal numbers used in the specification and claims, such as "first", "second", etc., are used to modify elements, and the ordinal numbers themselves neither imply and represent that the (or these) elements have any previous ordinal numbers nor represent the order of one element with another, or the order of manufacturing methods. The use of the ordinal numbers is merely used to clearly distinguish an element with a certain name from another element with the same name. The same terms may not be used in the claims and the specification. Therefore, a first component in the specification may be a second component in the claims.

In the disclosure, the electrical connection or coupling described may refer to either the direct connection or the indirect connection. In the case of the direct connection, the endpoints of the elements on two circuits are directly connected or interconnected by a conductor segment. In the case of the indirect connection, switches, diodes, capacitors, inductors, resistors, other suitable elements, or combinations thereof exist between the endpoints of the elements on the two circuits, but not limited thereto.

In the disclosure, the measurement methods of thickness, length, and width may be measured by using an optical microscope (OM), and thickness or width may be measured from cross-sectional images in an electron microscope, but not limited thereto. In addition, any two values or directions used for comparison may have a certain error. Furthermore, the terms "equal to," "equivalent," "the same," "substantially," or "approximately" mentioned in the disclosure generally represent within a 10% range of the given value or range. Moreover, the wordings "a given range from a first value to a second value," "a given range falls within the range of a first value to a second value," or "a given range is between a first value and a second value" indicate that the given range includes the first value, the second value, and other values therebetween. If a first direction is perpendicular to a second direction, the angle between the first direction and the second direction may be between 80 degrees and 100 degrees; if a first direction is parallel to a second direction, the angle between the first direction and the second direction may be between 0 degrees and 10 degrees.

It should be noted that in the following embodiments, without departing from the spirit of the disclosure, features in several different embodiments may be replaced, reorganized, and mixed to complete other embodiments. As long as the features of the various embodiments do not violate the spirit of the disclosure or conflict with each other, the various embodiments may be mixed and matched arbitrarily.

Unless otherwise defined, all terms used herein (including technical and scientific terms) have the same meaning as commonly understood by those of ordinary skill in the art of the disclosure. It can be understood that these terms, for example, as defined in commonly used dictionaries, should be interpreted as having meanings consistent with the relevant technology and the background or context of the disclosure, and should not be interpreted in an idealized or overly formal manner, unless specifically defined in the embodiments of the disclosure.

In the disclosure, the electronic device may include a display device, a backlight device, an antenna device, a sensing device, a vehicle device, or a splicing device, but not limited thereto. The electronic device may be a bendable or flexible electronic device. The display device may be a non-self-illuminating display device or a self-illuminating display device. The electronic device may include, for example, liquid crystals, light-emitting diodes, fluorescence, phosphor, quantum dots (QD), other suitable display media, or combinations thereof. The antenna device may include, for example, a Frequency Selective Surface (FSS), a RF-Filter, a polarizer, a resonator, or an antenna, etc. The antenna may be a liquid crystal antenna or a non-liquid crystal antenna. The sensing device may be a sensing device for sensing capacitance, light, heat or ultrasonic, but not limited thereto. In the disclosure, the electronic device may include an electronic element, which may include passive elements and active elements, such as capacitors, resistors, inductors, diodes, transistors, etc. Diodes may include light-emitting diodes or photodiodes. Light-emitting diodes may include, for example, organic light emitting diodes (OLEDs), mini LEDs, micro LEDs, or quantum dot LEDs, but not limited thereto. The splicing device may be, for example, a display splicing device or an antenna splicing device, but not limited thereto. It should be noted that the electronic device may be any permutation and combination of the aforementioned, but not limited thereto. In addition, the shape of the electronic device may be rectangular, circular, polygonal, curved-edged, or other suitable shapes. The electronic device may have peripheral systems such as a drive system, a control system, a light source system, etc., to support the display device, the antenna device, the wearable device (e.g., including glasses configured for augmented reality or virtual reality), the vehicle mounted device (e.g., including automotive windshields), or the splicing device.

Figure 1B:
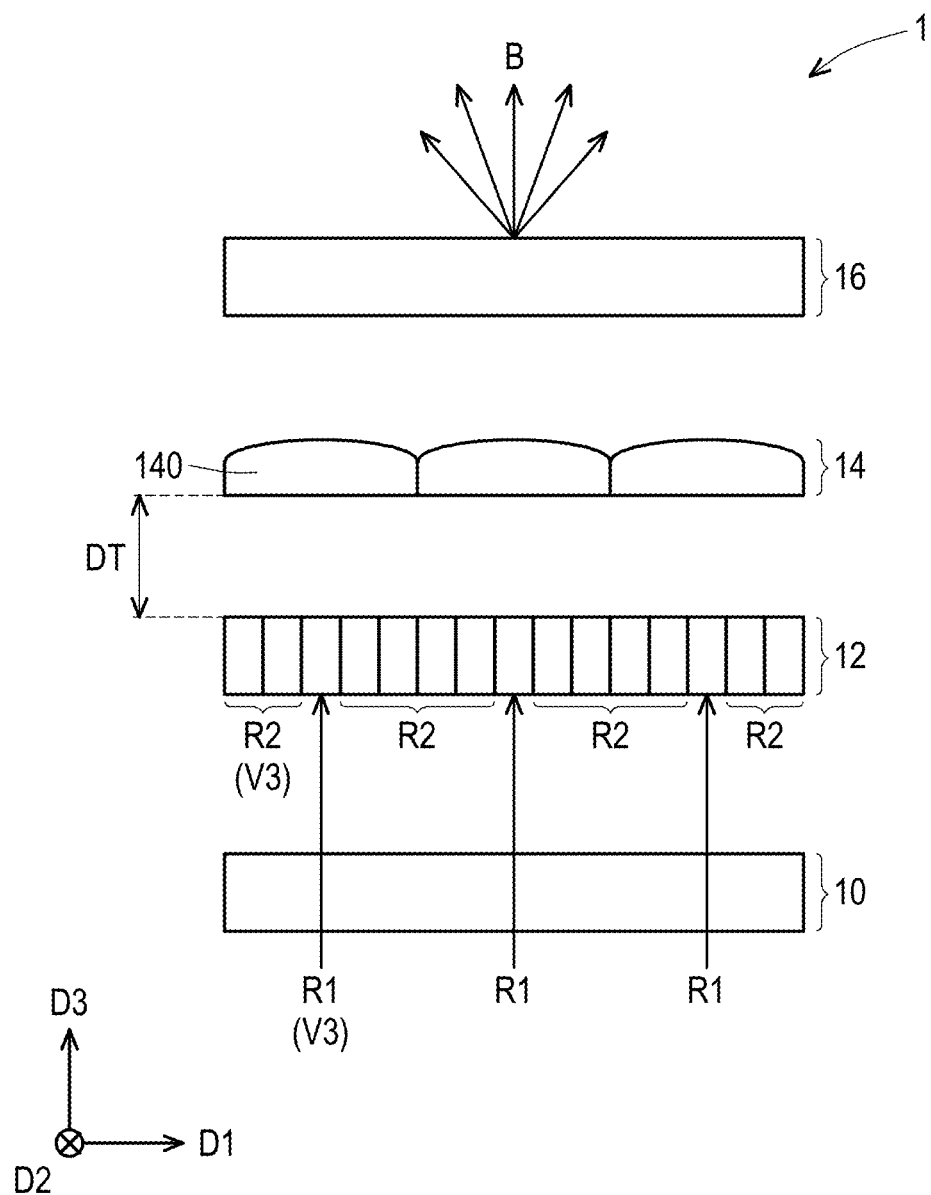
Figure 2:
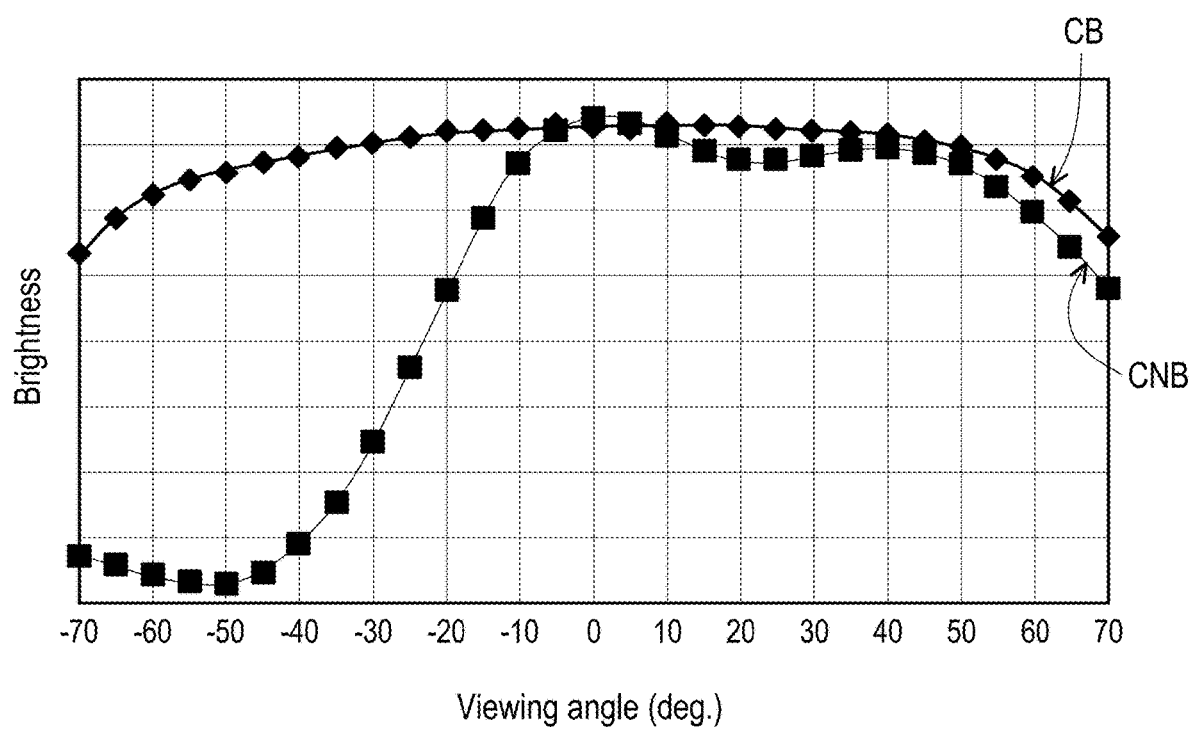
FIG. 2 is a diagram showing the relationship between viewing angle and brightness.
Figure 3:
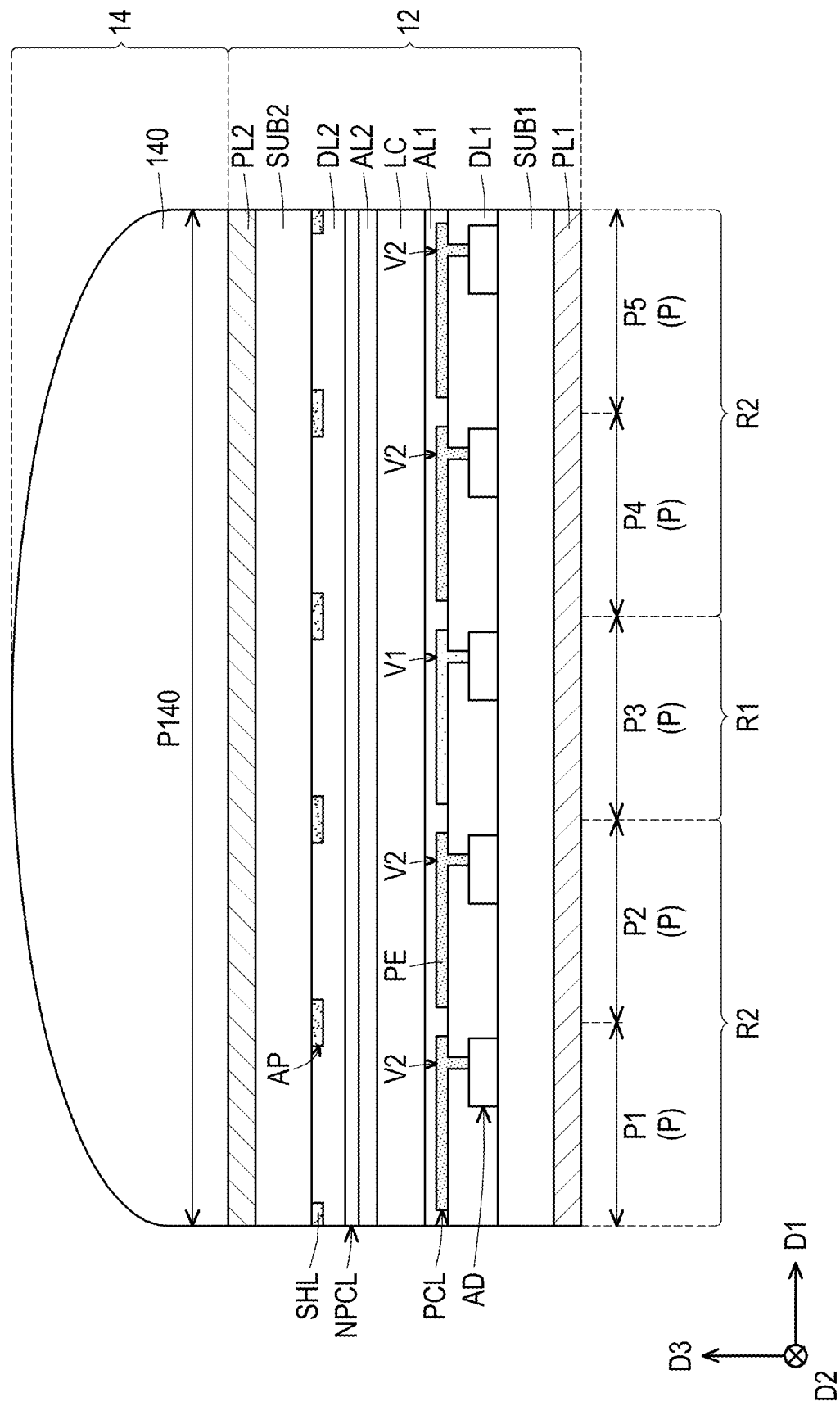
FIG. 3 is a partial enlarged schematic diagram of a first viewing angle control unit and a lens array in FIG. 1.
Figure 4:
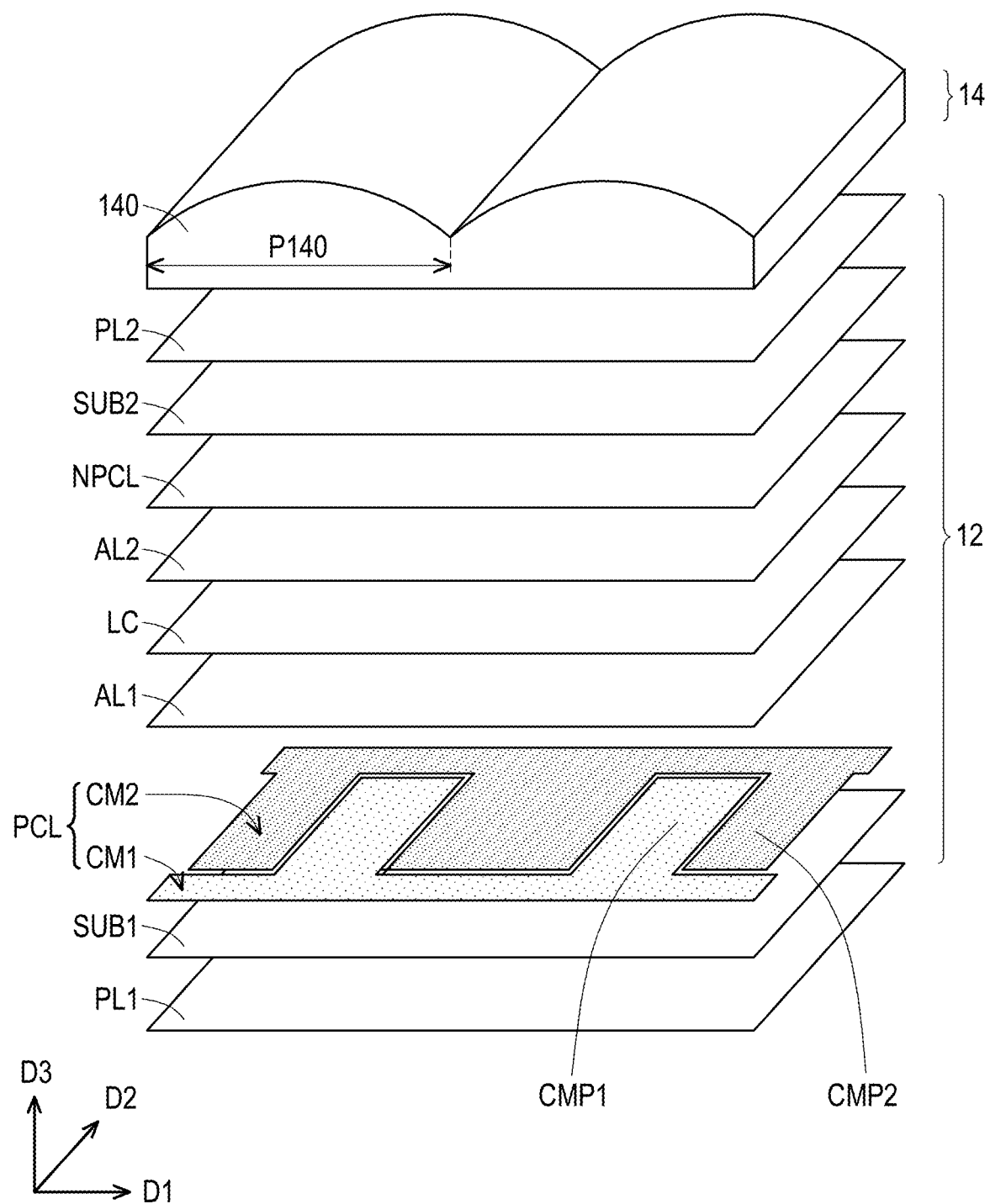
FIG. 4 is another partial enlarged schematic diagram of the first viewing angle control unit and the lens array in FIG. 1.
Figure 5:
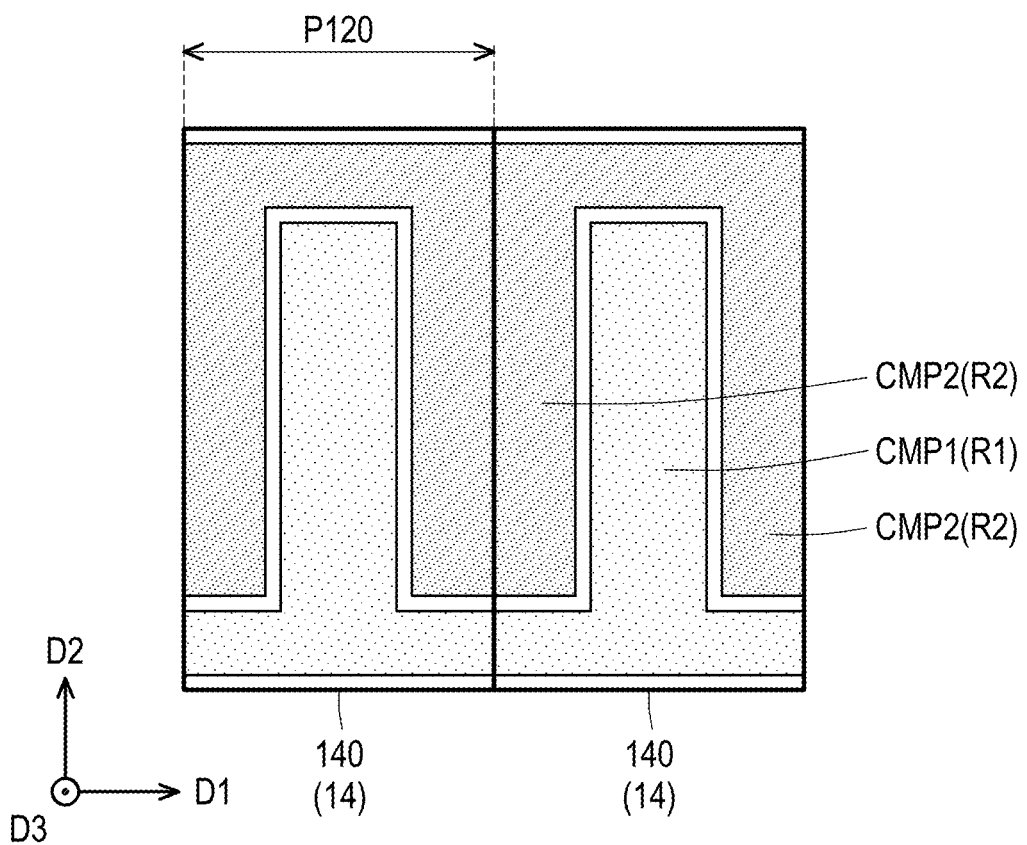
FIG. 5 is a schematic top view of FIG. 4.
Figure 6:
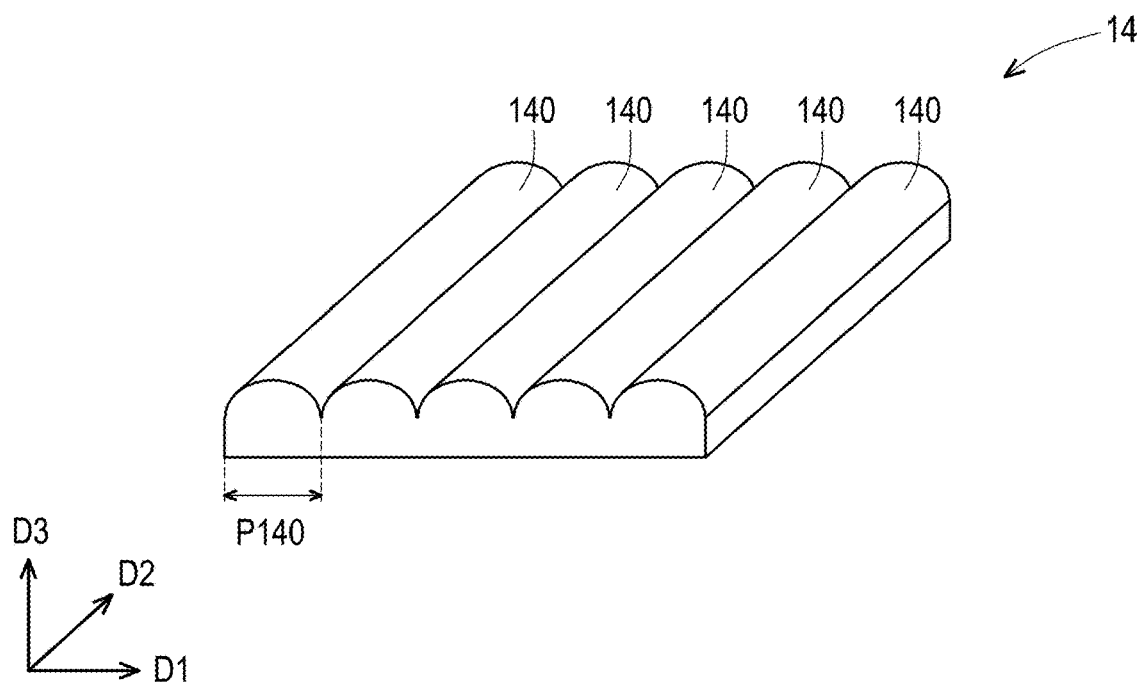
FIG. 6 is a schematic diagram of the lens array in FIG. 1.
Figure 7:
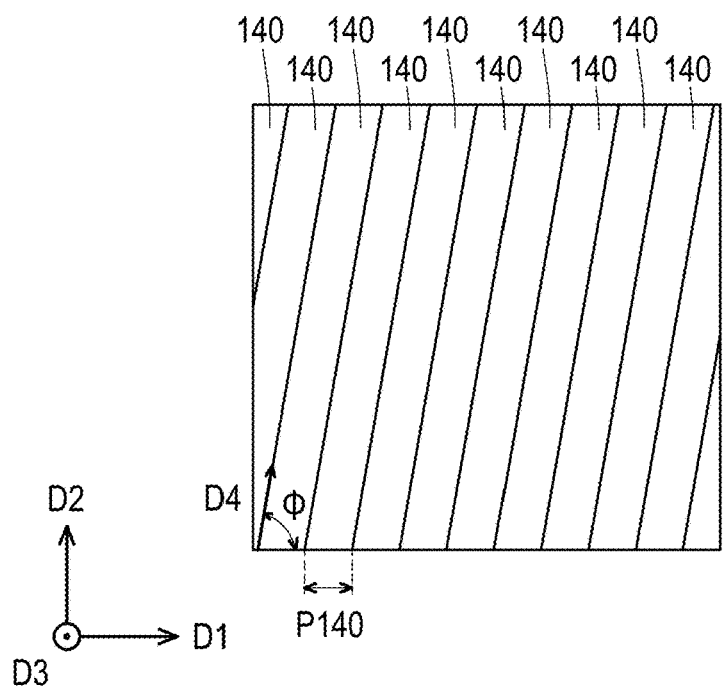
FIG. 7 is a schematic top view of the lens array in FIG. 1.
Figure 8:
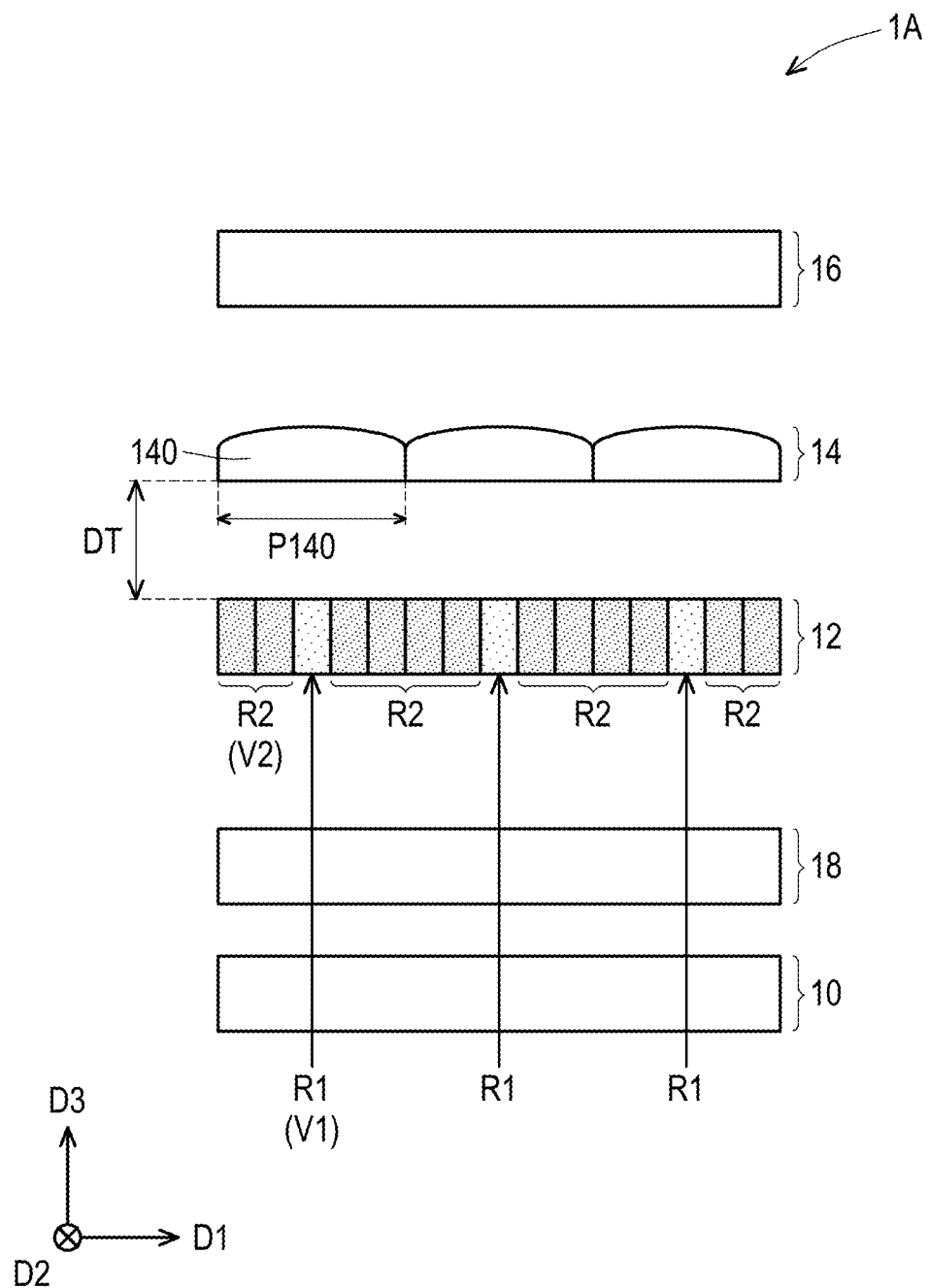
FIG. 8 is a partial cross-sectional schematic diagram of an electronic device in a privacy mode according to some embodiments of the disclosure.
Figure 9:
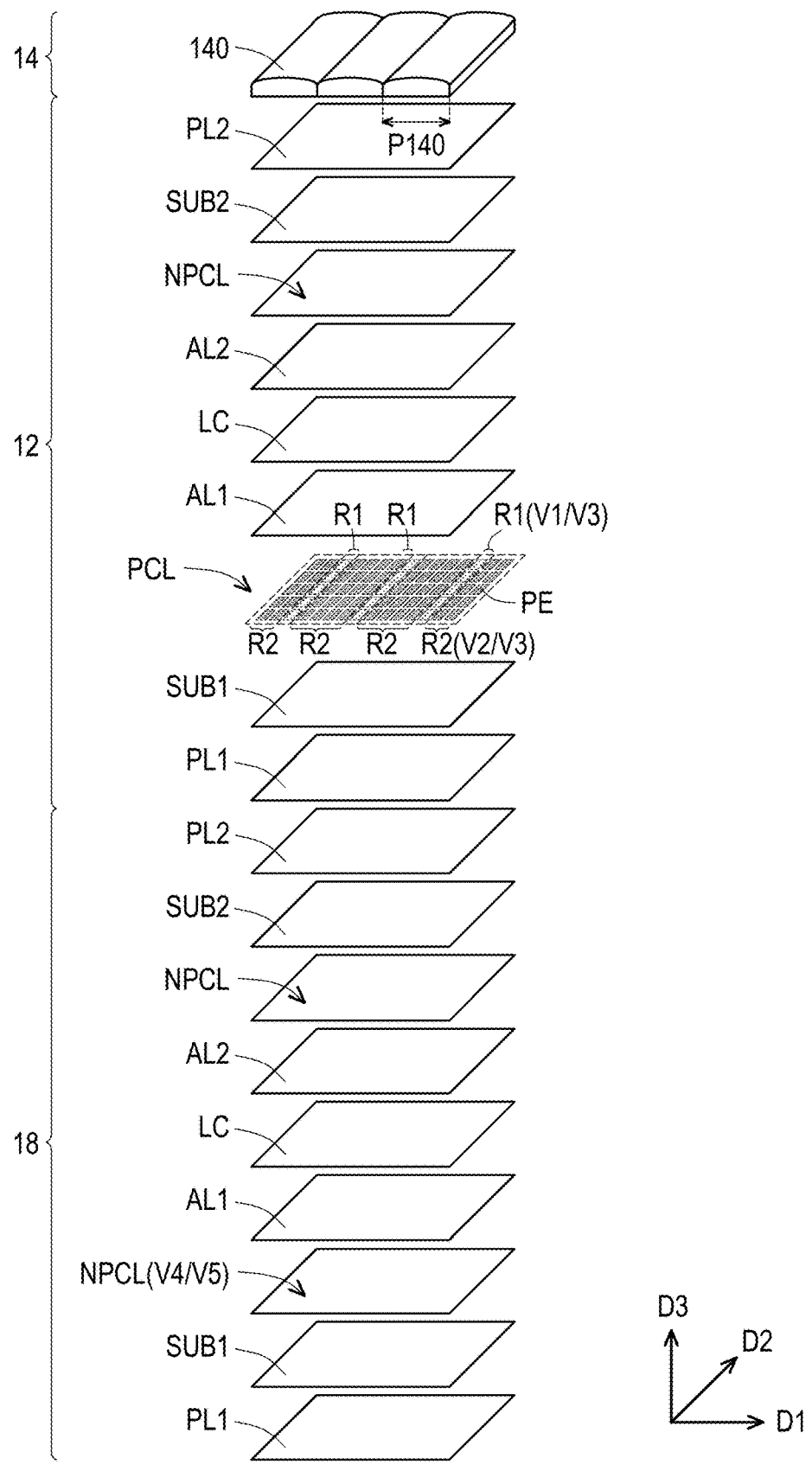
FIG. 9 is an exploded schematic diagram of a first viewing angle control unit, a second viewing angle control unit and a lens array in FIG. 8.
Figure 10:
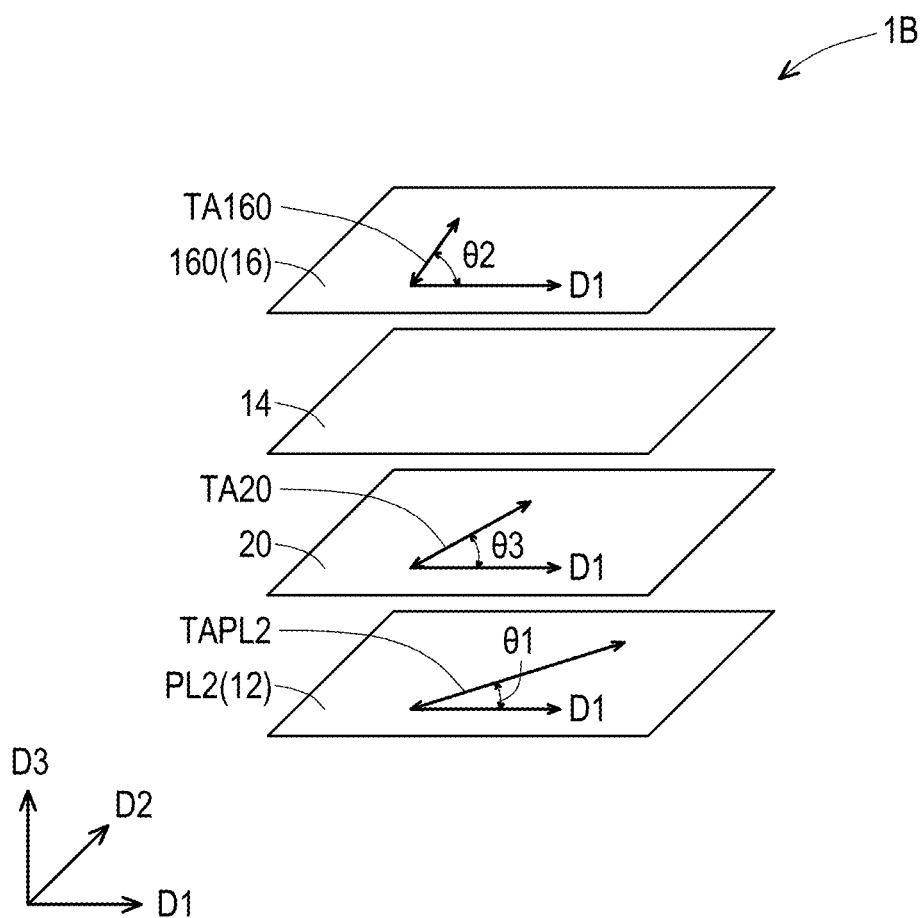
FIG. 10 is a partial exploded schematic diagram of an electronic device according to some embodiments of the disclosure.
Figure 11:
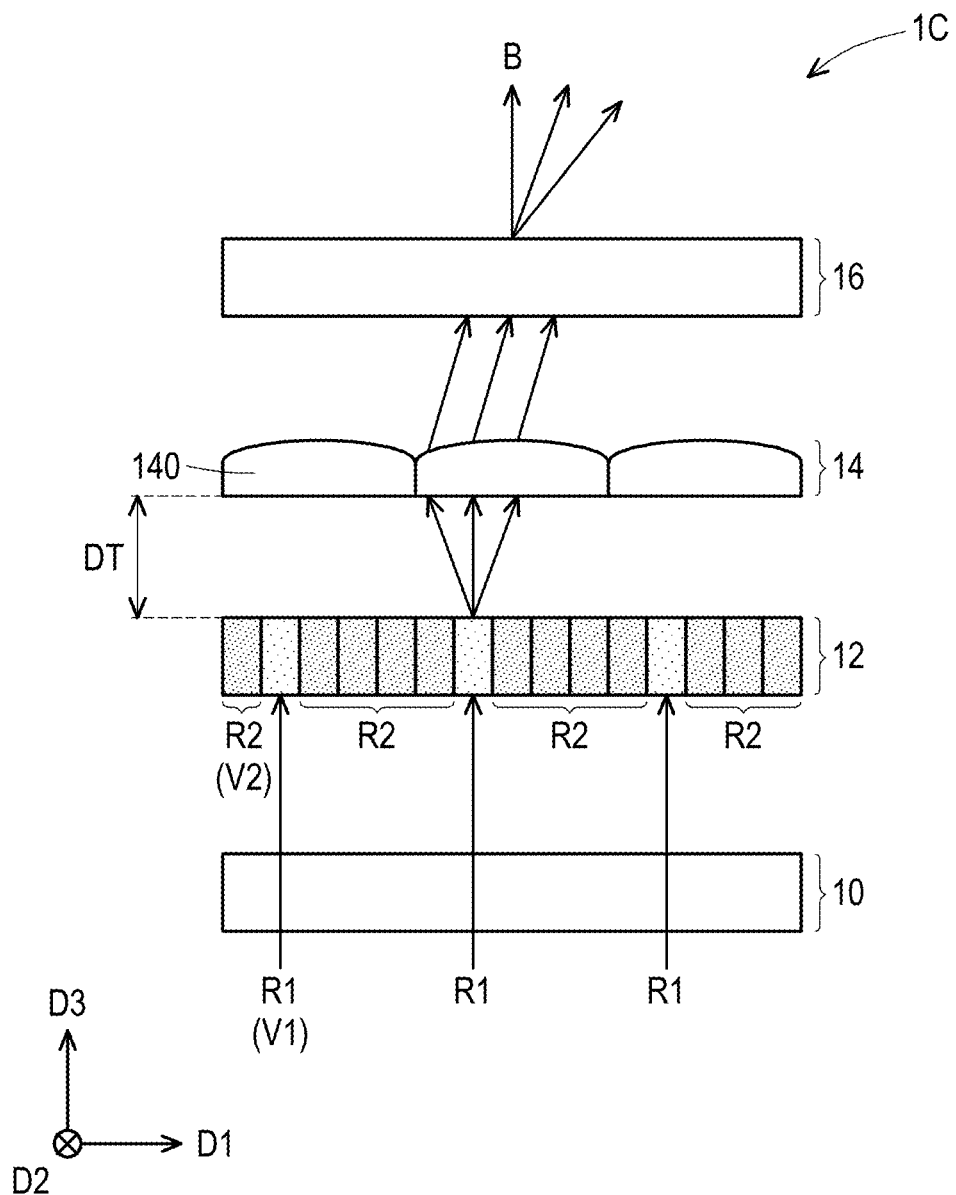
FIG. 11 is a partial cross-sectional schematic diagram of an electronic device in a privacy mode according to some embodiments of the disclosure.

FIG. 1A and FIG. 1B are respectively partial cross-sectional schematic diagrams of an electronic device in a privacy mode and a share mode according to some embodiments of the disclosure. FIG. 2 is a diagram showing the relationship between viewing angle and brightness. FIG. 3 is a partial enlarged schematic diagram of a first viewing angle control unit and a lens array in FIG. 1. FIG. 4 is another partial enlarged schematic diagram of the first viewing angle control unit and the lens array in FIG. 1. FIG. 5 is a schematic top view of FIG. 4. FIG. 6 is a schematic diagram of the lens array in FIG. 1. FIG. 7 is a schematic top view of the lens array in FIG. 1. FIG. 8 is a partial cross-sectional schematic diagram of an electronic device in a privacy mode according to some embodiments of the disclosure. FIG. 9 is an exploded schematic diagram of a first viewing angle control unit, a second viewing angle control unit and a lens array in FIG. 8. FIG. 10 is a partial exploded schematic diagram of an electronic device according to some embodiments of the disclosure. FIG. 11 is a partial cross-sectional schematic diagram of an electronic device in a privacy mode according to some embodiments of the disclosure.

Referring to FIG. 1A and FIG. 1B, an electronic device 1 according to some embodiments of the disclosure is provided. The electronic device 1 is configured to switch between a share mode (FIG. 1B) and a privacy mode (FIG. 1A). As shown in FIG. 1A and FIG. 1B, light B output from the electronic device 1 has a wider divergence angle in the share mode than in the privacy mode. Namely, the electronic device 1 has a larger viewing angle in the share mode than in the privacy mode. As such, the electronic device 1 can be applied to equipment with requirements such as privacy protection or image interference reduction, such as automotive equipment, but not limited thereto.

As shown in FIG. 1A and FIG. 1B, the electronic device 1 may include a light emitting unit 10, a first viewing angle control unit 12, a lens array 14 and a display unit 16, but not limited thereto. According to different requirements, the electronic device 1 may further include other elements or film layers.

The light emitting unit 10 is configured to provide illumination light and may be referred to as a backlight. The light emitting unit 10 may include any kind of light source. For example, the light emitting unit 10 may include an edge type light source, direct type light source, a cold cathode fluorescent lamp (CCFL), a plurality of LEDs, a plurality of mini LEDs, a plurality of micro LEDs, a plurality of OLEDs, etc.

The first viewing angle control unit 12 is disposed on the light emitting unit 10. In some embodiments, as shown in FIG. 1A and FIG. 1B, the first viewing angle control unit 12 is the only one viewing angle control unit between the light emitting unit 10 and the display unit 16, but not limited thereto. The first viewing angle control unit 12 is, for example, an electronically controlled viewing angle control unit configured to control the viewing angle of the electronic device 1 through regional voltage modulation (explained later).

In some embodiments, as shown in FIG. 3, the first viewing angle control unit 12 includes a substrate SUB1, a substrate SUB2, a plurality of active elements AD, a dielectric layer DL1, a patterned conductive layer PCL, an alignment layer AL1, a liquid crystal layer LC, an alignment layer AL2, a non-patterned conductive layer NPCL, a dielectric layer DL2, a shielding layer SHL, a polarizer PL1 and a polarizer PL2, but not limited thereto. According to different requirements, the first viewing angle control unit 12 may further include other elements or film layers.

The substrate SUB2 is overlapped with the substrate SUB1 along a thickness direction (e.g., a direction D3) of the electronic device 1. Each of the substrate SUB1 and the substrate SUB2 may be a flexible substrate or a rigid substrate. A material of each of the substrate SUB1 and the substrate SUB2 may include glass, plastic, ceramic, quartz, sapphire, or a combination of the above materials, but not limited to.

The plurality of active elements AD are disposed on a surface of the substrate SUB1 facing the substrate SUB2. The plurality of active elements AD may be arranged in an array along a direction D1 and a direction D2. The direction D1 and the direction D2 are both perpendicular to the direction D3. The direction D2 is intersected with the direction D1 and is, for example, perpendicular to the direction D1, but not limited thereto. In some embodiments, each of the plurality of active elements AD is a switch element, such as a thin film transistor, and each of the plurality of active elements AD includes a gate electrode, a semiconductor pattern, a source electrode and a drain electrode, but not limited thereto.

The dielectric layer DL1 is disposed on the surface of the substrate SUB1 facing the substrate SUB2 and covers the plurality of active elements AD. The dielectric layer DL1 may be a single layer or multiple layers. A material of the dielectric layer DL1 may include an inorganic material, an organic material or a combination thereof. For example, the material of the dielectric layer DL1 may include silicon oxide, silicon nitride, silicon oxynitride, aluminum oxide, polymethyl methacrylate (PMMA), epoxy, acrylic-based resin, silicone, polyimide polymer, other inorganic material, other organic material or a combination of at least two of the above.

The patterned conductive layer PCL is disposed on the dielectric layer DL1 and includes, for example, a plurality of pixel electrodes PE. Each of the plurality of pixel electrodes PE is electrically connected to a corresponding active element AD. For example, each of the plurality of pixel electrodes PE is electrically connected to the drain electrode of the corresponding active element AD. A material of the patterned conductive layer PCL may include a transparent conductive material, such as metal oxide (e.g., indium tin oxide, indium zinc oxide, aluminum tin oxide, aluminum zinc oxide, indium germanium zinc oxide or other metal oxides), carbon nanotube, graphene, other suitable materials, or a combination thereof, but not limited to.

The alignment layer AL1 is disposed on the dielectric layer DL1 and covers the patterned conductive layer PCL. The alignment layer AL2 is overlapped with the alignment layer AL1 along the direction D3, and the liquid crystal layer LC is located between the alignment layer AL1 and the alignment layer AL2. A material of each of the alignment layer AL1 and the alignment layer AL2 may include polymer, but not limited thereto. The liquid crystal layer LC is, for example, a twisted nematic liquid crystal layer or a vertical alignment liquid crystal layer. In the embodiments in which the liquid crystal layer LC is a vertical alignment liquid crystal layer, the liquid crystal layer LC maybe doped with a chiral compound, and a chiral pitch may be 10 µm, but not limited thereto. The liquid crystal layer LC is configured to provide phase retardation to incident light. In some embodiments, phase retardation of the first viewing angle control unit 12 is 300 nm to 2000 nm, but not limited thereto.

The shielding layer SHL is disposed on a surface of the substrate SUB2 facing the substrate SUB1. A material of the shielding layer SHL may include opaque organic polymer material. The opaque organic polymer material can be a white, gray or black organic polymer material, such as a black matrix, but is not limited thereto. The shielding layer SHL may include a plurality of apertures AP overlapped with the plurality of pixel electrodes PE along the direction D3 to allow light (e.g., the illumination light from the light emitting unit 10) to pass through.

The dielectric layer DL2 is disposed on the surface of the substrate SUB2 facing the substrate SUB1 and covers the shielding layer SHL. The dielectric layer DL2 may be a single layer or multiple layers. A material of the dielectric layer DL2 may refer to the material of the dielectric layer DL1, and the descriptions are not repeated herein.

The non-patterned conductive layer NPCL is disposed on the dielectric layer DL2 and located between the dielectric layer DL2 and the alignment layer AL2. In some embodiments, the non-patterned conductive layer NPCL fully covers the dielectric layer DL2, but not limited thereto. A material of the non-patterned conductive layer NPCL may refer to the material of the patterned conductive layer PCL, and the descriptions are not repeated herein. The alignment layer AL2 is disposed on the non-patterned conductive layer NPCL and located between the non-patterned conductive layer NPCL and the liquid crystal layer LC.

The polarizer PL1 is disposed on a surface of the substrate SUB1 away from the substrate SUB2. The polarizer PL2 is disposed on a surface of the substrate SUB2 away from the substrate SUB1. In some embodiments, a transmission axis (not shown in FIG. 3) of the polarizer PL1 is perpendicular to a transmission axis (not shown in FIG. 3) of the polarizer PL2, but not limited thereto.

In some embodiments, the first viewing angle control unit 12 includes a plurality of pixels P (a pixel P1, a pixel P2, a pixel P3, a pixel P4 and a pixel P5 are schematically shown in FIG. 3). The plurality of pixels P may be arranged in an array along the direction D1 and the direction D2. In some embodiments, each of the plurality of pixels P include one corresponding active element AD, one pixel electrode PE electrically connected to the one corresponding active element AD.

The first viewing angle control unit 12 may be divided into a plurality of regions, and different regions of the first viewing angle control unit 12 may be applied with different voltages in the privacy mode so as to control a transmission direction and/or light distribution of the light output from the light output region of the first viewing angle control unit 12. In some embodiments, as shown in FIG. 3, the first viewing angle control unit 12 includes a first region R1 and a second region R2 adjacent to the first region R1. In some embodiments, each of the first region R1 and the second region R2 includes at least one column of pixels (e.g., pixels P arranged along the direction D2). For example, the first region R1 includes the pixel P3 and multiple pixels (not shown) arranged along the direction D2 together with the pixel P3.

By changing the voltage difference between the plurality of pixel electrodes PE and the non-patterned conductive layer (or referred to as a common electrode layer), the tilting direction of a plurality of liquid crystal molecules (not shown) in the liquid crystal layer LC can be changed, thereby changing the transmittance of the first viewing angle control unit 12. By controlling the voltage difference in the first region R1 and the second region R2 respectively, the transmittance of the first region R1 and the second region R2 can be controlled respectively, and a transmission direction and/or light distribution of the light output from the light output region of the first viewing angle control unit 12 can be modulated.

In some embodiments, the non-patterned conductive layer is provided with a constant voltage or a ground voltage, and a voltage provided to the plurality of pixel electrodes PE in the first region R1 or the second region R2 is changed according to the mode (e.g., the share mode or the privacy mode) of the electronic device 1. Namely, the voltage difference in the first region R1 or the second region R2 can be changed by changing the voltage provided to the plurality of pixel electrodes PE in the first region R1 or the second region R2, but the disclosure is not limited thereto.

In the privacy mode, a first voltage V1 may be provided to the first region R1 (e.g., to the pixel electrodes PE of the pixel P3 and the pixel electrodes PE of other pixels P (not shown) arranged along the direction D2 together with the pixel P3) of the first viewing angle control unit 12, and a second voltage V2 that is different from the first voltage V1 is provided to the second region R2 (e.g., to the multiple pixel electrodes PE of the pixel P1, the pixel P2, the pixel P4 and the pixel P5 in FIG. 3 and the pixel electrodes PE of other pixels P (not shown) arranged along the direction D2 together with the pixel P1, the pixel P2, the pixel P4 or the pixel P5) of the first viewing angle control unit 12, such that the first region R1 and the second region R2 have different transmittance. For example, the transmittance of the first region R1 is greater than the transmittance of the second region R2 in the privacy mode. On the other hand, in the share mode, a third voltage V3 (shown in FIG. 1B) is provided to both of the first region R1 and the second region R2 of the first viewing angle control unit 12, and the third voltage V3 is different from the second voltage V2. In some embodiments, the first voltage V1 is between the third voltage V3 and the second voltage V2. For example, in the embodiments in which the liquid crystal layer LC of the first viewing angle control unit 12 is a twisted nematic liquid crystal layer, V3<V1<V2. On the other hand, in the embodiments in which the liquid crystal layer LC of the first viewing angle control unit 12 is a vertical alignment liquid crystal layer, V3>V1>V2.

Take FIG. 1A and FIG. 1B as an example, in the share mode, the third voltage V3 is provided to both of the first region R1 and the second region R2 of the first viewing angle control unit 12 to turn the plurality of pixels P in the first region R1 or the second region R2 into a bright state; in the privacy mode, the first voltage V1 is provided to the first region R1 of the first viewing angle control unit 12 to turn the plurality of pixels P in the first region R1 into a narrow bight state, and the second voltage V2 is provided to the second region R2 of the first viewing angle control unit 12 to turn the plurality of pixels P in the second region R2 into a dark state.

Please refer to FIG. 2, curve CB and curve CNB represent the bight state and the narrow bight state, respectively. As can be seen from the curve CB, the bight state has a wider and symmetrical viewing angle and a relatively uniform brightness across a specific viewing angle range (e.g., from −70° to 70°) or a small brightness difference across the specific viewing angle range. Specifically, the light emitted from the first viewing angle control unit 12 in the bight state diverges to a variety of angles (e.g., viewing angle from −70° to 70°, as shown in FIG. 2) and has the maximum brightness at viewing angle of 0 degrees, and the brightness decreases as the absolute value of the viewing angle increases. For example, the brightness decreases approximately symmetrically as the absolute value of the viewing angle increases.

On the other hand, as can be seen from the curve CNB, the narrow bight state has a narrower and asymmetrical viewing angle, and the brightness difference is large within the specific viewing angle range (e.g., from −70° to 70°). Specifically, the light emitted from the first viewing angle control unit 12 in the narrow bight state diverges toward the positive viewing angle and has the maximum brightness at viewing angle of 0 degrees, and the brightness drops abruptly toward the negative viewing angle and decreases gently toward the positive viewing angle.

Through the narrow bight state characteristics, the viewing angle can be narrowed unilaterally in the privacy mode. In this way, when applied to an automotive equipment (e.g., when the electronic device 1 serve as an automotive type privacy display), the light B output from the electronic device 1 in the privacy mode can be prevented from interfering with the driver while driving.

Referring back to FIG. 1A and FIG. 1B, the lens array 14 is disposed on the first viewing angle control unit 12. In some embodiments, a distance DT between the lens array 14 and the first viewing angle control unit 12 is equal to a focal length of the lens array 14 so as to collimate the divergent light from the first viewing angle control unit 12.

In some embodiments, as shown in FIG. 6 or FIG. 7, the lens array 14 includes a plurality of lenticular lenses 140. In some embodiments, as shown in FIG. 6, the plurality of lenticular lenses 140 are arranged along the direction D1 and extend along the direction D2, but not limited thereto. In other embodiments, as shown in FIG. 7, the plurality of lenticular lenses 140 are arranged along the direction D1 and extend along a direction D4 not perpendicular to the direction D1, but not limited thereto. A lens phi angle ϕ is included between the extension direction (e.g., the direction D4) and the arrangement direction (e.g., the direction D1) of the plurality of lenticular lenses 140. In some embodiments, as shown in FIG. 7, the lens phi angle ϕ may be 30 degrees to 150 degrees to improve the field of view (FoV) or the Moiré problem. In some embodiments, in an iso-luminance contour of the first viewing angle control unit 12 in the narrow bright state, the direction of the dark side can be 75 degrees to 105 degrees clockwise from the extension direction (e.g., the direction D4) of the plurality of lenticular lenses 140 and/or 75 degrees to 105 degrees counterclockwise from the extension direction (e.g., the direction D4) of the plurality of lenticular lenses 140.

In some embodiments, based on considerations such as manufacturing feasibility, convenience, and/or optical performance, a lens pitch P140 of the lens array 14 is 100 μm to 1000 μm. In some embodiments, the lens pitch P140 of the lens array 14 is smaller than 300 μm to further reduce the visibility of the lens pattern.

In some embodiments, as shown in FIG. 3, each of the plurality of lenticular lenses 140 is overlapped with more than one column of pixel electrodes PE. FIG. 3 schematically illustrates that a lenticular lens 140 overlaps with five columns of pixel electrodes PE, in which the pixel electrode PE in the pixel P1 of the first column, the pixel electrode PE of the pixel P2 of the second column, the pixel electrode PE in the pixel P3 of the third column, the pixel electrode PE in the pixel P4 of the fourth column and the pixel electrode PE in the pixel P5 of the fifth column are shown. In some embodiments, as shown in FIG. 3, the first region R1 may be 20% of the lens pitch P140 of the lens array 14, and the second region R2 may be 80% of the lens pitch P140 of the lens array 14, but not limited thereto. The first region R1 may be 20% to 50% of the lens pitch P140 of the lens array 14, and the second region R2 may be 80% to 50% of the lens pitch P140 of the lens array 14.

Referring back to FIG. 1A and FIG. 1B, the display unit 16 is disposed on the lens array 14. The display unit 16 is configured to convert the illumination light into image light (e.g., light with display information (such as grayscale and/or color)). The display unit 16 may include any kind of non-self-illuminating display device, such as a liquid crystal display device. The liquid crystal display device includes, for example, a twisted nematic liquid crystal display device, a vertical alignment liquid crystal display device, an in plane switching liquid crystal display device, a fringe field switching liquid crystal display device, a super twisted nematic (STN) display device, an electrically controllable birefringence (ECB) liquid crystal display device, etc. The display unit 16 may be a transmissive and transflective type display device.

Since the color of the light B output from the electronic device 1 can be tuned by the display unit 16, it is not necessary for the first viewing angle control unit 12 to include a color filter layer.

Although the first viewing angle control unit 12 in FIG. 3 is driven in an active matrix mode, it should be understood that the first viewing angle control unit 12 can also be driven in a passive mode. The first viewing angle control unit 12 in FIG. 4 is driven in a passive mode. In some embodiments, as shown in FIG. 4, the first viewing angle control unit 12 includes the substrate SUB1, the substrate SUB2, the patterned conductive layer PCL, the alignment layer AL1, the liquid crystal layer LC, the alignment layer AL2, the non-patterned conductive layer NPCL, the polarizer PL1 and the polarizer PL2, but not limited thereto. According to different requirements, the first viewing angle control unit 12 may further include other elements or film layers.

The patterned conductive layer PCL includes a first comb electrode CM1 and a second comb electrode CM2 electrically isolated from the first comb electrode CM1. The first comb electrode CM1 includes a plurality of first comb portions CMP1, and the second comb electrode CM2 includes a plurality of second comb portions CMP2. As shown in FIG. 4 or FIG. 5, the plurality of first comb portions CMP1 and the plurality of second comb portions CMP2 are alternately arranged along a first direction (e.g., the direction D1) and extend along a second direction (e.g., the direction D2) intersected with the first direction. Each of the plurality of lenticular lenses 140 is overlapped with a corresponding first comb portion CMP1 and portions of two second comb portions CMP2 located on opposite sides of the corresponding first comb portion CMP1.

In the embodiments shown in FIG. 4 and FIG. 5, the first region R1 is, for example, the region occupied by the first comb portion CMP1 and the second region R2 is, for example, the region occupied by the second comb portions CMP2. The first region R1 may be 20% to 50% of the lens pitch P140 of the lens array 14, and the second region R2 may be 80% to 50% of the lens pitch P140 of the lens array 14. In some embodiments, as shown in FIG. 5, the first region R1 may be 50% of the lens pitch P140 of the lens array 14, and the second region R2 may be 50% of the lens pitch P140 of the lens array 14. In the privacy mode, the first voltage V1 is provided to the plurality of first comb portions CMP1, and the second voltage V2 is provided to the plurality of second comb portions CMP2. On the other hand, in the share mode, the third voltage V3 is provided to the plurality of first comb portions CMP1 and the plurality of second comb portions CMP2.

Referring to FIG. 8 and FIG. 9, an electronic device 1A is similar to the electronic device 1 in FIG. 1A and FIG. 1B. The main differences between the electronic device 1A and the electronic device 1 are described below.

The electronic device 1A further includes a second viewing angle control unit 18 disposed between the first viewing angle control unit 12 and the light emitting unit 10. Namely, there are two viewing angle control units between the light emitting unit 10 and the display unit 16. In FIG. 9, the first viewing angle control unit 12 is driven in an active matrix mode; however, the first viewing angle control unit 12 can also be driven in a passive mode. For example, the plurality of pixel electrodes PE of the patterned conductive layer PCL in FIG. 9 can be replaced by the first comb electrode CM1 and the second comb electrode CM2 shown in FIG. 4.

The second viewing angle control unit 18 is similar to the first viewing angle control unit 12 except that the second viewing angle control unit 18 includes two non-patterned conductive layers NPCL. In other words, the state of the second viewing angle control unit 18 is modulated as a whole instead of regionally modulated like the first viewing angle control unit 12. In some embodiments, the non-patterned conductive layer NPCL between the alignment layer AL2 and the substrate SUB2 in the second viewing angle control unit 18 is provided with a constant voltage or a ground voltage, and a voltage provided to the non-patterned conductive layer NPCL between the alignment layer AL1 and the substrate SUB1 in the second viewing angle control unit 18 is changed according to the mode (e.g., the share mode or the privacy mode) of the electronic device 1. For example, a fourth voltage V4 is provided to the second viewing angle control unit 18 in the privacy mode to turn the second viewing angle control unit 18 into a narrow bright state, a fifth voltage V5 is provided to the second viewing angle control unit 18 in the share mode to turn the second viewing angle control unit 18 into a bright state, and the fourth voltage V4 is different from the fifth voltage V5.

In some embodiments, the first viewing angle control unit 12 and the second viewing angle control unit 18 include liquid crystal layers LC of the same type and alignment layers AL1/AL2 with opposite rubbing directions. For example, the liquid crystal layers LC of the first viewing angle control unit 12 and the second viewing angle control unit 18 are twisted nematic liquid crystal layers. The alignment layer AL1 of the first viewing angle control unit 12 and the alignment layer AL1 of the second viewing angle control unit 18 may have opposite rubbing directions (e.g., an included angle between the two rubbing directions is 180 degrees), and the alignment layer AL2 of the first viewing angle control unit 12 and the alignment layer AL2 of the second viewing angle control unit 18 may have opposite rubbing directions. The rubbing direction of the alignment layer AL2 of the first viewing angle control unit 12 or the second viewing angle control unit 18 is intersected with (e.g., perpendicular to) the rubbing direction of the alignment layer AL1 of the first viewing angle control unit 12 or the second viewing angle control unit 18. For example, an included angle between the rubbing direction of the alignment layer AL1 of the second viewing angle control unit 18 and the direction D1 is 45 degrees, an included angle between the rubbing direction of the alignment layer AL2 of the second viewing angle control unit 18 and the direction D1 is 135 degrees, an included angle between the rubbing direction of the alignment layer AL1 of the first viewing angle control unit 12 and the direction D1 is 225 degrees, and an included angle between the rubbing direction of the alignment layer AL2 of the first viewing angle control unit 12 and the direction D1 is 315 degrees. In such embodiments, the first voltage V1 is between the third voltage V3 and the second voltage V2, the fourth voltage V4 may be equal to the first voltage V1, and the fifth voltage V5 may be equal to the third voltage V3.

By disposing two TN mode viewing angle control units between the light emitting unit 10 and the lens array 14 and using the two TN mode viewing angle control units to respectively reduce large viewing angle light leakage on opposite sides of the 0-degree viewing angle, light leakage at large viewing angles in the privacy mode can be effectively improved.

Alternatively, the first viewing angle control unit 12 and the second viewing angle control unit 18 include liquid crystal layers of different types, and the third voltage V3 may be is equal to the first voltage V1. For example, the liquid crystal layer LC of the first viewing angle control unit 12 may be an in plane switching liquid crystal layer or a vertical alignment liquid crystal layer, and the liquid crystal layer LC of the second viewing angle control unit 18 may be a twisted nematic liquid crystal layer or an electrically controllable birefringence liquid crystal layer. In some embodiments, the liquid crystal layer LC of the first viewing angle control unit 12 is an in plane switching liquid crystal layer, and the liquid crystal layer LC of the second viewing angle control unit 18 is a twisted nematic liquid crystal layer. In other embodiments, the liquid crystal layer LC of the first viewing angle control unit 12 is a vertical alignment liquid crystal layer (or an in plane switching liquid crystal layer or other liquid crystal layer), and the liquid crystal layer LC of the second viewing angle control unit 18 is an electrically controllable birefringence liquid crystal layer.

In the embodiments in which the first viewing angle control unit 12 and the second viewing angle control unit 18 include liquid crystal layers of different types, the first region R1 of the first viewing angle control unit 12 is turned into a bright state in both of the privacy mode and the share mode, while the second region R2 of the first viewing angle control unit 12 is turned into a dark state and the bright state respectively in the privacy mode and the share mode. In addition, the second viewing angle control unit 18 is turned into a narrow bright state and a bright state respectively in the privacy mode and the share mode.

By disposing two different mode viewing angle control units between the light emitting unit 10 and the lens array 14, light leakage at large viewing angles in the privacy mode and/or the light leakage at the dark state can be effectively improved.

In the embodiments in which the liquid crystal layer LC of the second viewing angle control unit 18 is an electrically controllable birefringence liquid crystal layer, the rubbing directions of the alignment layer AL1 and the alignment layer AL2 are parallel to the extension direction of the plurality of lenticular lenses 140. In addition, the transmission axis of the polarizer PL1 is parallel to the transmission axis of the polarizer PL2, and each of the transmission axis of the polarizer PL1 and the transmission axis of the polarizer PL2 may be parallel or perpendicular to the rubbing directions of the alignment layer AL1 and the alignment layer AL2.

Referring to FIG. 10, for illustration purposes, some elements or film layers are not shown in FIG. 10. An electronic device 1B is similar to the electronic device 1 in FIG. 1A and FIG. 1B. The main differences between the electronic device 1B and the electronic device 1 are described below.

The electronic device 1B further includes a half-wave plate (HWP) 20 to increase the amount of light output from the electronic device 1B or to reduce light loss due to the transmission axis TA160 of the rear polarizer 160 (e.g., the polarizer of the display unit 16 that is closer to the first viewing angle control unit 12) of the display unit 16 is not parallel to the transmission axis TAPL2 of the polarizer PL2 of the first viewing angle control unit 12. In some embodiments, phase retardation of the half-wave plate 20 is 275 nm±25 nm. In some embodiments, an inclined angle θ3 (e.g., an angle included between the direction D1 and the optical axis TA20) of the optical axis TA20 of the half-wave plate 20 is half of the sum of an inclined angle θ1 (e.g., an angle included between the direction D1 and the transmission axis TAPL2) of the transmission axis TAPL2 of the polarizer PL2 of the first viewing angle control unit 12 and an inclined angle θ2 (e.g., an angle included between the direction D1 and the transmission axis TA160) of the transmission axis TA160 of the rear polarizer 160 of the display unit 16.

In some embodiments, as shown in FIG. 10, the half-wave plate 20 is disposed between the polarizer PL2 of the first viewing angle control unit 12 and the lens array 14, but not limited thereto. In other embodiments, although not shown, the polarizer PL2 of the first viewing angle control unit 12 may be disposed between the half-wave plate 20 and the lens array 14; the half-wave plate 20 may be disposed between the lens array 14 and the rear polarizer 160 of the display unit 16; or the rear polarizer 160 of the display unit 16 may be disposed between the lens array 14 and the half-wave plate 20.

Referring to FIG. 11, an electronic device 1C is similar to the electronic device 1 in FIG. 1A and FIG. 1B. The main difference between the electronic device 1C and the electronic device 1 is that the position of the first region R1 is deviated from the center of a corresponding lenticular lens 140 (e.g., the position of the first region R1 is shift toward the peripheral of the corresponding lenticular lens 140) to adjust the transmission direction and/or light distribution of the light B output from the electronic device 1C.

In summary, in the embodiments of the disclosure, by controlling the voltages provided to the first region R1 and the second region R2 respectively in the privacy mode, the transmittance of the first region R1 and the second region R2 can be controlled respectively, and a transmission direction and/or light distribution of the light output from the light output region of the first viewing angle control unit 12 can be modulated. With the cooperation of the first viewing angle control unit and the lens array, the reduction in light leakage at large viewing angles in the privacy mode can be achieved. Therefore, the privacy performance of the electronic device can be kept.

The above various embodiments are merely for illustrating the technical solutions of the disclosure, and not for limiting them; although the disclosure has been described in detail with reference to the foregoing embodiments, those of ordinary skill in the art should understand that: they may still make modifications to the technical solutions described in the foregoing various embodiments, or perform equivalent replacements for some or all of the technical features; and these modifications or replacements do not cause the essence of the corresponding technical solutions to deviate from the scope of the technical solutions of the various embodiments of the disclosure.

Although the embodiments and their advantages of the disclosure have been disclosed as above, it should be understood that those of ordinary skill in the art may make variations, substitutions, and modifications without departing from the spirit and the scope of the disclosure, and the features between the various embodiments may be arbitrarily mixed and replaced to form other new embodiments. In addition, the scope of protection of the disclosure is not limited to the processes, machinery, manufacture, material compositions, devices, methods, and steps described in the specific embodiments in the specification. Those of ordinary skill in the art may understand, from the content disclosed in the disclosure, the processes, machinery, manufacture, material compositions, devices, methods, and steps developed now or in the future, which may be used according to the disclosure as long as substantially the same functions may be performed or substantially the same results may be obtained in the embodiments described herein. Therefore, the scope of protection of the disclosure includes the above-mentioned processes, machinery, manufacture, material compositions, devices, methods, and steps. Furthermore, each claim constitutes an individual embodiment, and the scope of protection of the disclosure also includes the combinations of various claims and embodiments. The scope of protection of the disclosure shall be subject to those defined by the attached claims.

What is claimed is:

1. An electronic device, configured to switch between a share mode and a privacy mode, comprising:
    a light emitting unit;
    a first viewing angle control unit disposed on the light emitting unit and comprising a first region and a second region adjacent to the first region;
    a lens array disposed on the first viewing angle control unit; and
    a display unit disposed on the lens array,
    wherein in the privacy mode, a first voltage is provided to the first region of the first viewing angle control unit, a second voltage is provided to the second region of the first viewing angle control unit, and the first voltage is different from the second voltage,
    wherein in the share mode, a third voltage is provided to both of the first region and the second region of the first viewing angle control unit, and the third voltage is different from the second voltage.

2. The electronic device according to claim 1, wherein the first region is 20% to 50% of a lens pitch of the lens array.

3. The electronic device according to claim 2, wherein the lens pitch is 100 μm to 1000 μm.

4. The electronic device according to claim 1, wherein a lens phi angle of the lens array is 30 degrees to 150 degrees.

5. The electronic device according to claim 1, wherein the first viewing angle control unit comprises a plurality of pixel electrodes, the lens array comprises a plurality of lenticular lenses, and each of the plurality of lenticular lenses is overlapped with more than one column of pixel electrodes.

6. The electronic device according to claim 1, wherein the first voltage is between the third voltage and the second voltage.

7. The electronic device according to claim 6, wherein the first viewing angle control unit comprises a twisted nematic liquid crystal layer or a vertical alignment liquid crystal layer.

8. The electronic device according to claim 1, further comprising:
    a second viewing angle control unit disposed between the first viewing angle control unit and the light emitting unit, wherein a fourth voltage is provided to the second viewing angle control unit in the privacy mode, a fifth voltage is provided to the second viewing angle control unit in the share mode, and the fourth voltage is different from the fifth voltage.

9. The electronic device according to claim 8, wherein the first viewing angle control unit and the second viewing angle control unit comprise liquid crystal layers of the same type and alignment layers with opposite rubbing directions.

10. The electronic device according to claim 9, wherein the first voltage is between the third voltage and the second voltage, the fourth voltage is equal to the first voltage, and the fifth voltage is equal to the third voltage.

11. The electronic device according to claim 10, wherein the liquid crystal layers of the first viewing angle control unit and the second viewing angle control unit are twisted nematic liquid crystal layers.

12. The electronic device according to claim 8, wherein the first viewing angle control unit and the second viewing angle control unit comprise liquid crystal layers of different types, and the third voltage is equal to the first voltage.

13. The electronic device according to claim 12, wherein the liquid crystal layer of the first viewing angle control unit is an in plane switching liquid crystal layer or a vertical alignment liquid crystal layer, and the liquid crystal layer of the second viewing angle control unit is a twisted nematic liquid crystal layer or an electrically controllable birefringence liquid crystal layer.

14. The electronic device according to claim 8, wherein the first viewing angle control unit comprises at least one patterned conductive layer, and the second viewing angle control unit comprises two non-patterned conductive layers.

15. The electronic device according to claim 1, wherein in the privacy mode, the first region and the second region have different transmittance.

16. The electronic device according to claim 1, wherein each of the first region and the second region comprises at least one column of pixels.

17. The electronic device according to claim 1, wherein phase retardation of the first viewing angle control unit is 300 nm to 2000 nm.

18. An electronic device, configured to switch between a share mode and a privacy mode, comprising:
    a light emitting unit;
    a first viewing angle control unit disposed on the light emitting unit and comprising a first region and a second region adjacent to the first region;
    a lens array disposed on the first viewing angle control unit; and a display unit disposed on the lens array, wherein in the privacy mode, a first voltage is provided to the first region of the first viewing angle control unit, a second voltage is provided to the second region of the first viewing angle control unit, and the first voltage is different from the second voltage, wherein:

the first viewing angle control unit comprises a first comb electrode and a second comb electrode electrically isolated from the first comb electrode, the first comb electrode comprises a plurality of first comb portions, and the second comb electrode comprises a plurality of second comb portions, the plurality of first comb portions and the plurality of second comb portions are alternately arranged along a first direction and extend along a second direction intersected with the first direction, the lens array comprises a plurality of lenticular lenses arranged along the first direction and extend along the second direction, and each of the plurality of lenticular lenses is overlapped with a corresponding first comb portion and portions of two second comb portions located on opposite sides of the corresponding first comb portion.

19. The electronic device according to claim 18, wherein in the privacy mode, the first voltage is provided to the plurality of first comb portions, and the second voltage is provided to the plurality of second comb portions.

* * * * *